(12) United States Patent
Teng et al.

(10) Patent No.: US 7,849,551 B2
(45) Date of Patent: Dec. 14, 2010

(54) ASSEMBLY TYPE CLEANING STRUCTURE FOR AN INDUCTION READER

(75) Inventors: Hong-Chun Teng, Taichung (TW); Chih-Mao Shiao, Taichung (TW); Ming-Chih Huang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 667 days.

(21) Appl. No.: 11/936,733

(22) Filed: Nov. 7, 2007

(65) Prior Publication Data

US 2009/0114728 A1    May 7, 2009

(51) Int. Cl.
*A47L 13/02*    (2006.01)

(52) U.S. Cl. .................. 15/236.06; 30/172; D32/46; 324/207.24

(58) Field of Classification Search ............. 15/236.01, 15/236.05, 236.06; 30/172; D32/46; 324/207.24; A47L 13/02
See application file for complete search history.

(56) References Cited

U.S. PATENT DOCUMENTS

| | | | | |
|---|---|---|---|---|
| 6,501,264 | B2 * | 12/2002 | Shiraishi et al. | 324/207.17 |
| 7,437,794 | B2 * | 10/2008 | Massaro | 15/236.06 |

* cited by examiner

*Primary Examiner*—David A Redding
(74) *Attorney, Agent, or Firm*—Banger Shia

(57) ABSTRACT

An assembly type cleaning structure for an induction reader comprises a positioning member with an assembling portion and restricting portions. With the assembling portion, the positioning member can be detachably assembled on the induction reader. And the restricting portions enable the positioning member to be forced onto the induction reader. The user can assemble the cleaning structure onto the induction reader or remove it by himself according to the environment.

3 Claims, 4 Drawing Sheets

ASSEMBLY TYPE CLEANING STRUCTURE FOR AN INDUCTION READER

BACKGROUND OF THE INVENTION

1. Field of the Invention

The present invention relates to a cleaning structure for an induction reader, and more particularly to an assembly type cleaning structure for an induction reader.

2. Description of the Prior Art

Conventional precision measuring tools usually utilize vernier caliper and micrometer to carry out measurement, or use guage block and height guage on a platform to perform displacement measurement. With the advancement of science and technology, the existing machines are provided with an ruler 10 and an induction reader 20 (as shown in FIG. 1) in order to ensure a precise displacement. The ruler 10 can be an optical scale or a magnetic ruler, and the induction reader 20 can be optical reader or magnetic reader. The ruler 10 is located a distance from the induction reader 20, and the induction reader 20 moves in parallel to the ruler 10. In practice, however, the ruler 10 and the induction reader 20 still have the problems as follows:

When the induction reader 20 moves relative to the ruler 10 to carry out measurement, external objects (such as dust) are likely to accumulate on the ruler 10, and when the height of the accumulation is higher than the distance between the induction reader 20 and the ruler 10, it will adversely affect the sensing and measuring quality, causing error signal and the measurement result cannot be obtained.

The present invention has arisen to mitigate and/or obviate the afore-described disadvantages.

SUMMARY OF THE INVENTION

The primary objective of the present invention is to provide a cleaning structure for an induction reader which can be detachably mounted on the induction reader.

To achieve the above objective, an assembly type cleaning structure for an induction reader is detachably mounted on an induction reader and comprises at least one positioning member and one fixing member. The positioning member includes an assembling portion for insertion of the fixing member and two restricting portions integrally formed on the assembling portion. The restricting portions are located a distance from each other and formed with two opposite abutting surfaces for clamping against the induction reader, each of the restricting portions is formed with a connecting surface adjacent the abutting surfaces, and a scraping member is mounted on the connecting surface. The fixing member is a screw. Such arrangements can achieve the following effects:

First, with the assembling portion, the user can assemble the cleaning structure onto the induction reader or remove it by himself according to the environment, the cleaning structure is not only simply structured and easy to use, but also its applicability is improved.

Second, the cleaning structure is positioned on the induction reader by the assembling portion and is restricted thereon by the restricting portions, so that the assembling strength and the service life of the cleaning structure are improved.

DETAILED DESCRIPTION OF THE PREFERRED EMBODIMENT

The present invention will be clearer from the following description when viewed together with the accompanying drawings, which show, for purpose of illustrations only, the preferred embodiment in accordance with the present invention.

Figure 1:
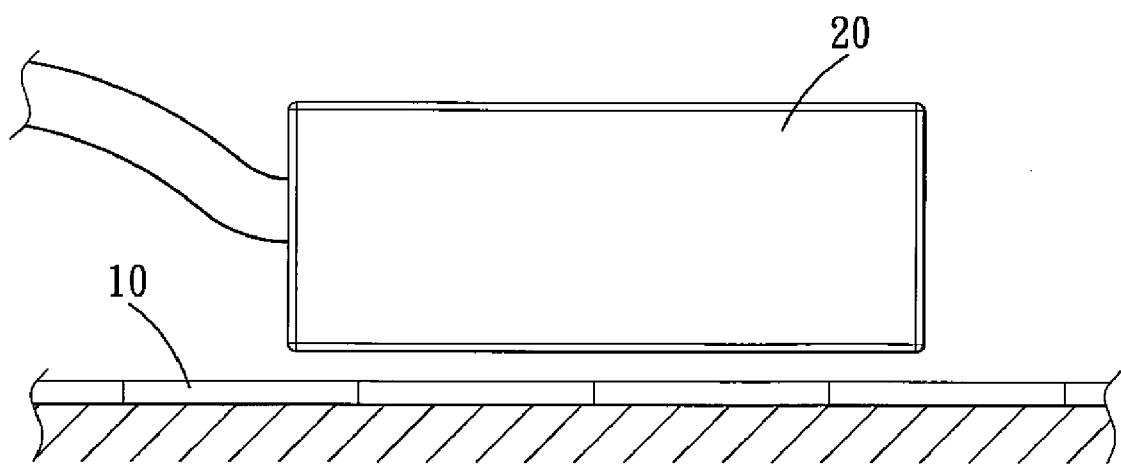
FIG. 1 is a plan view of a conventional cleaning structure for an induction reader.
Figure 2:
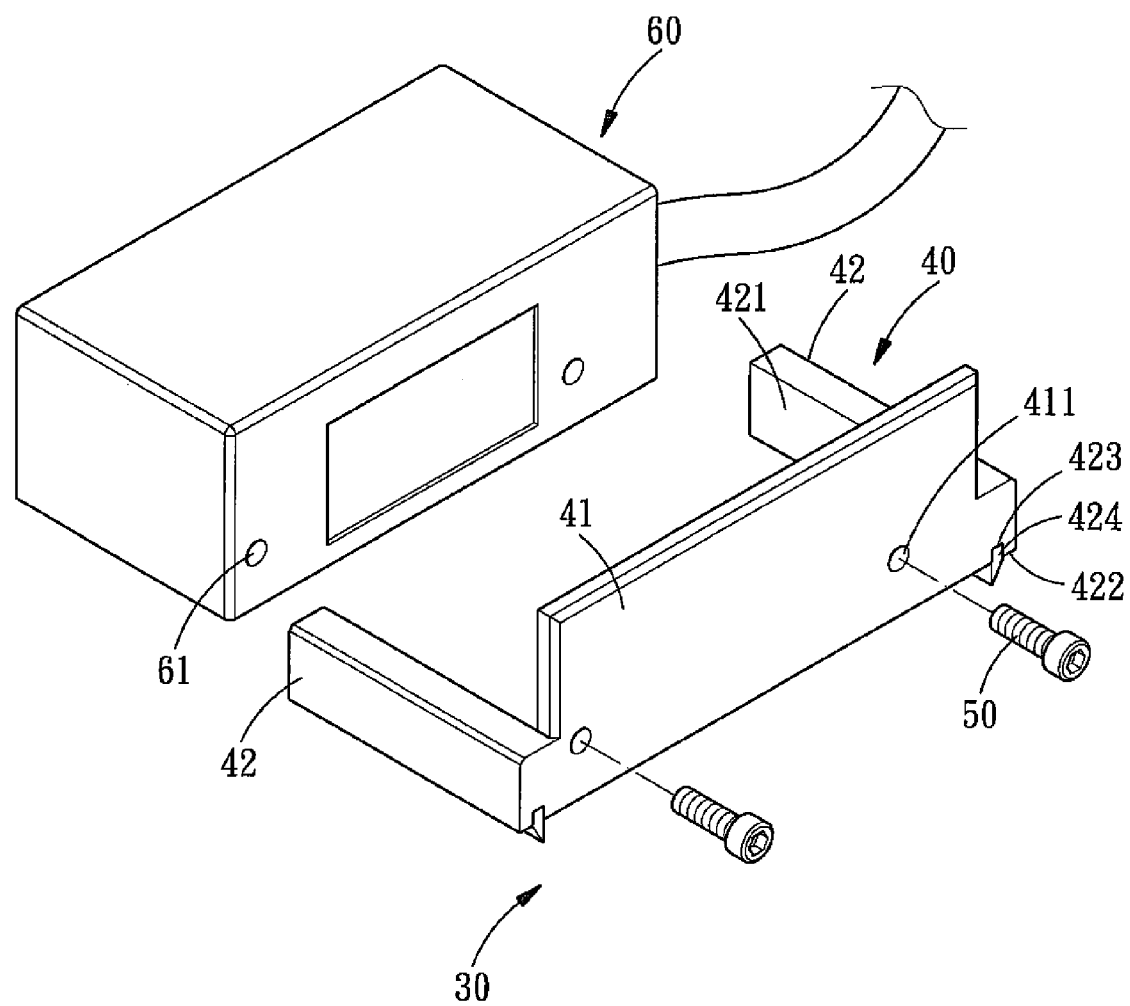
FIG. 2 is an exploded view of an assembly type cleaning structure for an induction reader in accordance with the present invention.
Figure 3:
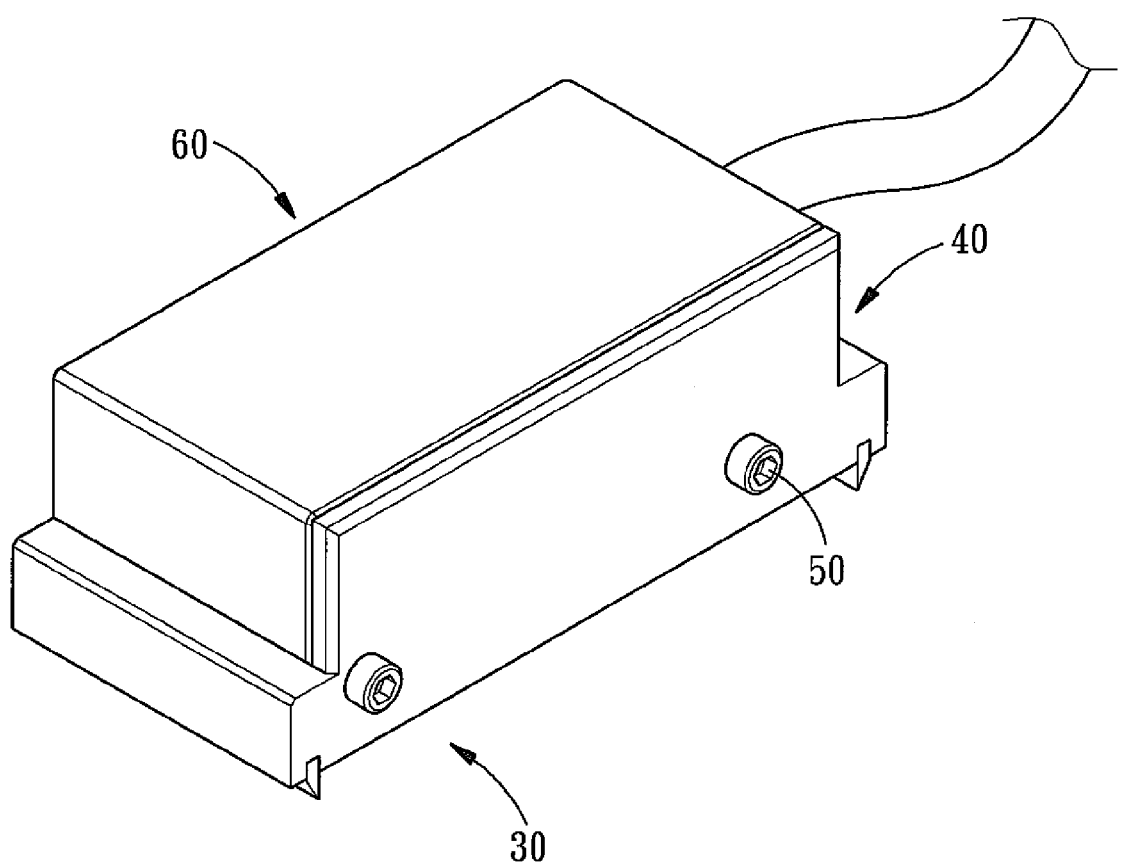
FIG. 3 is a perspective view of the assembly type cleaning structure for an induction reader in accordance with the present invention.
Figure 4:
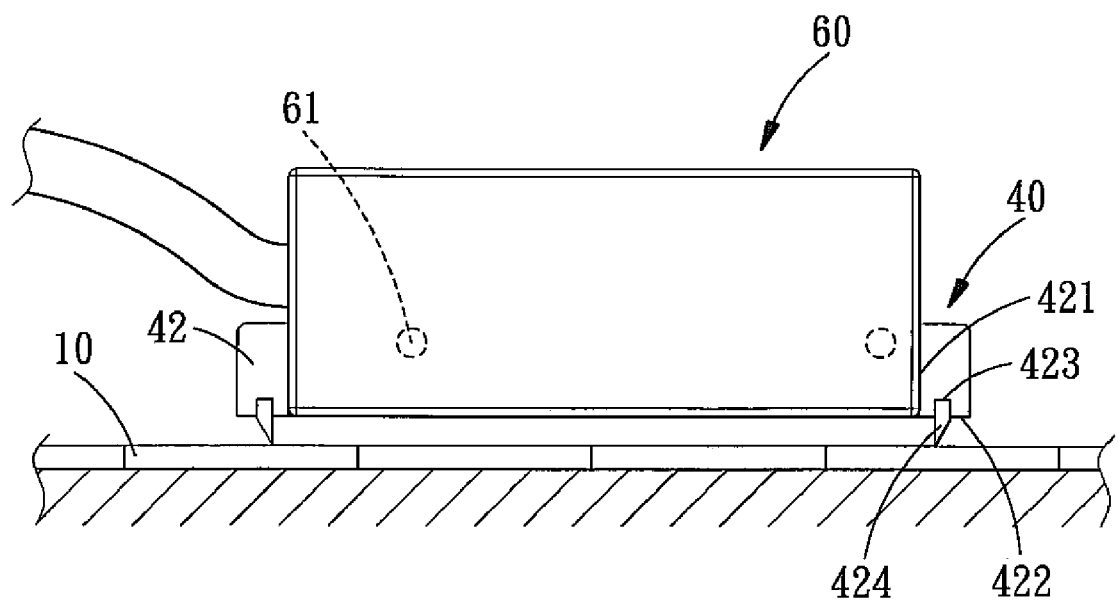
FIG. 4 is a plan view of the assembly type cleaning structure for an induction reader in accordance with the present invention.

Referring to FIGS. 2-4, an assembly type cleaning structure 30 for an induction reader in accordance with the present invention comprises: a positioning member 40 and two fixing members 50. The positioning member 40 is [-shaped and includes an assembling portion 41 and two restricting portions 42.

The assembling portion 41 is rectangular-shaped and is defined with two spaced apart through holes 411 for insertion of the two fixing members 50.

The two restricting portions 42 are formed in the shape of a rectangular block and integrally and vertically formed at both ends of the assembling portion 41. The two restricting portions 42 are parallel to and located a distance from each other. Each restricting portion 42 is formed with an opposite abutting surface 421. A connecting surface 422 with an engaging groove 423 is defined on a side of the each restricting portion 42 and is adjacent and vertical to the corresponding abutting surface 421. The engaging groove 423 of the connecting surface 422 is to be engaged with a scraping member 424.

The fixing members 50 are screws.

The cleaning structure 30 is assembled on an induction reader 60 which is defined with two threaded holes 61 to be aligned with the through hole 411 of the assembling portion 41 of the positioning member 40 for insertion of the fixing members 50.

In assembly, the through holes 411 of the assembling portion 41 of the positioning member 40 of the cleaning structure 30 are aligned with the threaded holes 61 of induction reader 60 initially, and the assembling portion 41 and the restricting portions 42 of the positioning member 40 are abutted against the induction reader 60. And then, the fixing members 50 are screwed through the through holes 411 of the assembling portion 41 into the threaded holes 61 of induction reader 60, so that the abutting surfaces 421 of the restricting portions 42 clamp against the induction reader 60.

When in use, the scraping member 424 of the restricting portion 42 of the positioning member 40 mounted on the induction reader 60 can be used to clean the foreign objects off the ruler 10.

To summarize, an assembly type cleaning structure for an induction reader in accordance with the present invention comprises a positioning member with an assembling portion and restricting portions. With the assembling portion, the positioning member can be detachably assembled on the induction reader. And the restricting portions enable the positioning member to be forced onto the induction reader.

While we have shown and described various embodiments in accordance with the present invention, it is clear to those skilled in the art that further embodiments may be made without departing from the scope of the present invention.

What is claimed is:

1. An assembly type cleaning structure for an induction reader being detachably mounted on an induction reader and comprising:

a positioning member including at least one assembling portion and two restricting portions integrally formed on the assembling portion, the assembling portion being mounted onto the induction reader, the restricting portions being located a distance from each other and formed with two opposite abutting surfaces for clamping against the induction reader, each of the restricting portions being formed with a connecting surface adjacent the abutting surfaces, and a scraping member being mounted on the connecting surface.

2. The assembly type cleaning structure for an induction reader as claimed in claim 1, wherein at least one through hole is formed in the assembling portion of the positioning member for insertion of at least one fixing member, the connecting surface is defined with an engaging groove for engaging with the scraping member, the fixing member is inserted through the through hole of the assembling portion into the induction reader.

3. The assembly type cleaning structure for an induction reader as claimed in claim 1, wherein the fixing member is a screw.

* * * * *